United States Patent
Hong et al.

(10) Patent No.: US 10,181,380 B2
(45) Date of Patent: Jan. 15, 2019

(54) MULTILAYER ELECTRONIC COMPONENT HAVING FIRST AND SECOND INTERNAL ELCTRODE PATTERNS ALTERNATELY STACKED, AND METHOD OF MANUFACTURING THE SAME

(71) Applicant: SAMSUNG ELECTRO-MECHANICS CO., LTD., Suwon-si, Gyeonggi-do (KR)

(72) Inventors: Yong Min Hong, Suwon-si (KR); Jae Yeol Choi, Suwon-si (KR); Ki Pyo Hong, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/855,540

(22) Filed: Dec. 27, 2017

(65) Prior Publication Data

US 2018/0122576 A1   May 3, 2018

Related U.S. Application Data

(63) Continuation of application No. 15/217,165, filed on Jul. 22, 2016, now Pat. No. 10,049,820.

(30) Foreign Application Priority Data

Dec. 29, 2015   (KR) .................. 10-2015-0188335

(51) Int. Cl.
    *H01G 4/30*   (2006.01)
    *H01G 4/012*   (2006.01)
    (Continued)

(52) U.S. Cl.
    CPC ............... *H01G 4/30* (2013.01); *H01G 4/012* (2013.01); *H01G 4/12* (2013.01); *H01G 4/232* (2013.01)

(58) Field of Classification Search
    CPC .......... H01G 4/30; H01G 4/232; H01G 4/012; H01G 4/12
    See application file for complete search history.

(56) References Cited

U.S. PATENT DOCUMENTS

3,829,356 A   8/1974   Rutt
4,771,520 A   9/1988   Tanaka et al.
(Continued)

FOREIGN PATENT DOCUMENTS

JP   04-171708 A    6/1992
JP   H11-340089 A   12/1999
(Continued)

OTHER PUBLICATIONS

Non-final Office Action dated Sep. 28, 2017 issued in U.S. Appl. No. 15/217,165.
(Continued)

*Primary Examiner* — David M Sinclair
(74) *Attorney, Agent, or Firm* — McDermott Will & Emery LLP

(57) ABSTRACT

A multilayer electronic component includes a body, first and second external electrodes, and first and second side parts. The body includes a multilayer structure in which first and second internal electrode patterns are alternately stacked and contains a dielectric material. The first and second side parts are disposed on outer surfaces of the body to face each other. The first and second external electrodes are disposed on outer surfaces of the body to face each other. The first internal electrode patterns are exposed to a third surface and a fifth surface of the body on which the first external electrode and the first side part are disposed, respectively. Additionally, the second internal electrode patterns are exposed to a fourth surface and a sixth surface of the body
(Continued)

on which the second external electrode and the second side part are disposed, respectively.

33 Claims, 9 Drawing Sheets

(51) Int. Cl.
  *H01G 4/12* (2006.01)
  *H01G 4/232* (2006.01)

(56) References Cited

U.S. PATENT DOCUMENTS

| | | | |
|---|---|---|---|
| 5,758,398 | A | 6/1998 | Rijnbeek et al. |
| 2011/0024033 | A1 | 2/2011 | Asano et al. |
| 2012/0147515 | A1 | 6/2012 | Kim et al. |
| 2012/0229949 | A1* | 9/2012 | Kim ............... H01G 4/005 361/321.2 |
| 2013/0208398 | A1 | 8/2013 | Tanaka et al. |
| 2014/0362492 | A1 | 12/2014 | Lee et al. |

FOREIGN PATENT DOCUMENTS

| | | |
|---|---|---|
| JP | 2002-184648 A | 6/2002 |
| JP | 2008-258481 A | 10/2008 |
| JP | 2013-165210 A | 8/2013 |

OTHER PUBLICATIONS

Korean Office Action dated Jan. 12, 2017, issued in Korean patent application No. 10-2015-0188335. (w/ English abstract).
Final Office Action issued in U.S. Appl. No. 15/217,165, dated Feb. 12, 2018.

\* cited by examiner

MULTILAYER ELECTRONIC COMPONENT HAVING FIRST AND SECOND INTERNAL ELCTRODE PATTERNS ALTERNATELY STACKED, AND METHOD OF MANUFACTURING THE SAME

CROSS-REFERENCE TO RELATED APPLICATION

This application is Continuation Patent Application of U.S. patent application Ser. No. 15/217,165, filed on Jul. 22, 2016 which claims the priority and benefit of Korean Patent Application No. 10-2015-0188335, filed on Dec. 29, 2015 with the Korean Intellectual Property Office, the disclosures of which are incorporated herein by reference.

BACKGROUND

The present disclosure relates to a multilayer electronic component and a method of manufacturing the same, and more particularly, to a multilayer ceramic capacitor and a method of manufacturing the same.

A multilayer ceramic capacitor may include a multilayer structure formed by stacking a plurality of sheets containing dielectric materials, external electrodes formed on outer surfaces of the multilayer structure and having different polarities, and internal electrodes alternately stacked within the multilayer structure and each connected to a respective one of the external electrodes.

The internal electrodes alternately formed between the plurality of sheets are connected to each other to have different polarities in order to generate capacitive coupling, whereby the multilayer ceramic capacitor has a capacitance value.

Recently, in order to increase capacitance of the multilayer ceramic capacitor and miniaturize the multilayer ceramic capacitor, various attempts to slim dielectric sheets to thereby increase the number of stacked dielectric sheets within a same sized component have been provided. Further, efforts have been made to optimize a margin part of a body having a multilayer structure in order to secure an increase in overlapping area between the internal electrodes.

SUMMARY

A multilayer electronic component of the present disclosure provides maximum coverage between internal electrode patterns to secure maximum capacitance while preventing short circuits between internal electrode patterns. The disclosure further details a method of manufacturing the same.

According to an aspect of the present disclosure, a multilayer electronic component may include a body, first and second external electrodes, and first and second side parts. The body includes a multilayer structure in which first and second internal electrode patterns are alternately stacked and contains a dielectric material. The first and second side parts are disposed on outer surfaces of the body to face each other. The first and second external electrodes are disposed on outer surfaces of the body to face each other. The first internal electrode patterns are exposed to a third outer surface and a fifth outer surface of the body on which the first external electrode and the first side part are disposed, respectively. Additionally, the second internal electrode patterns are exposed to a fourth outer surface and a sixth surface outer of the body on which the second external electrode and the second side part are disposed, respectively.

According to another aspect of the present disclosure, a method of manufacturing a multilayer electronic component may include forming first and second ceramic green sheets using a slurry containing a powder having a dielectric property, a binder, and a solvent. First and second internal electrode base patterns are printed on one surface of the first and second ceramic green sheets, respectively, the first and second internal electrode base patterns including one or more strip shapes that are the same shape as each other. The first ceramic green sheets, including the first internal electrode base patterns, and the second ceramic green sheets, including the second internal electrode base patterns, are alternatively stacked. A multilayer bar in which the first and second ceramic green sheets are stacked is cut to form individual bodies each including a multilayer structure in which first and second internal electrode patterns are alternately stacked and containing a dielectric material. First and second side parts are disposed on two opposing outer surfaces of each body, and first and second external electrodes are disposed on two other opposing outer surfaces of each body.

According to a further aspect of the present disclosure, a multilayer electronic component includes a body including alternately stacked first and second internal electrodes disposed in a dielectric body. The first and second internal electrodes each have rectangular strip shapes that are the same shape as each other, and the first and second internal electrodes are stacked in a vertical direction such that the first internal electrodes are offset in a horizontal direction with respect to the second internal electrodes in the body.

According to another aspect of the present disclosure, a method includes alternately stacking first and second ceramic green sheets in a vertical direction to form a multilayer bar, where the first and second ceramic green sheets each respectively have first and second internal electrodes disposed thereon, each of the first and second internal electrodes includes two or more rectangular strip shapes that are the same shape as each other and spaced apart from each other, and the first and second ceramic green sheets are stacked such that the first internal electrodes are offset in a horizontal direction with respect to the second internal electrodes in the multilayer bar. In turn, the multilayer bar is cut along at least one vertical cutting surface to form two or more individualized bodies, where the cutting of the multilayer bar exposes on one vertical cutting surface only the first internal electrodes from among the first and second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
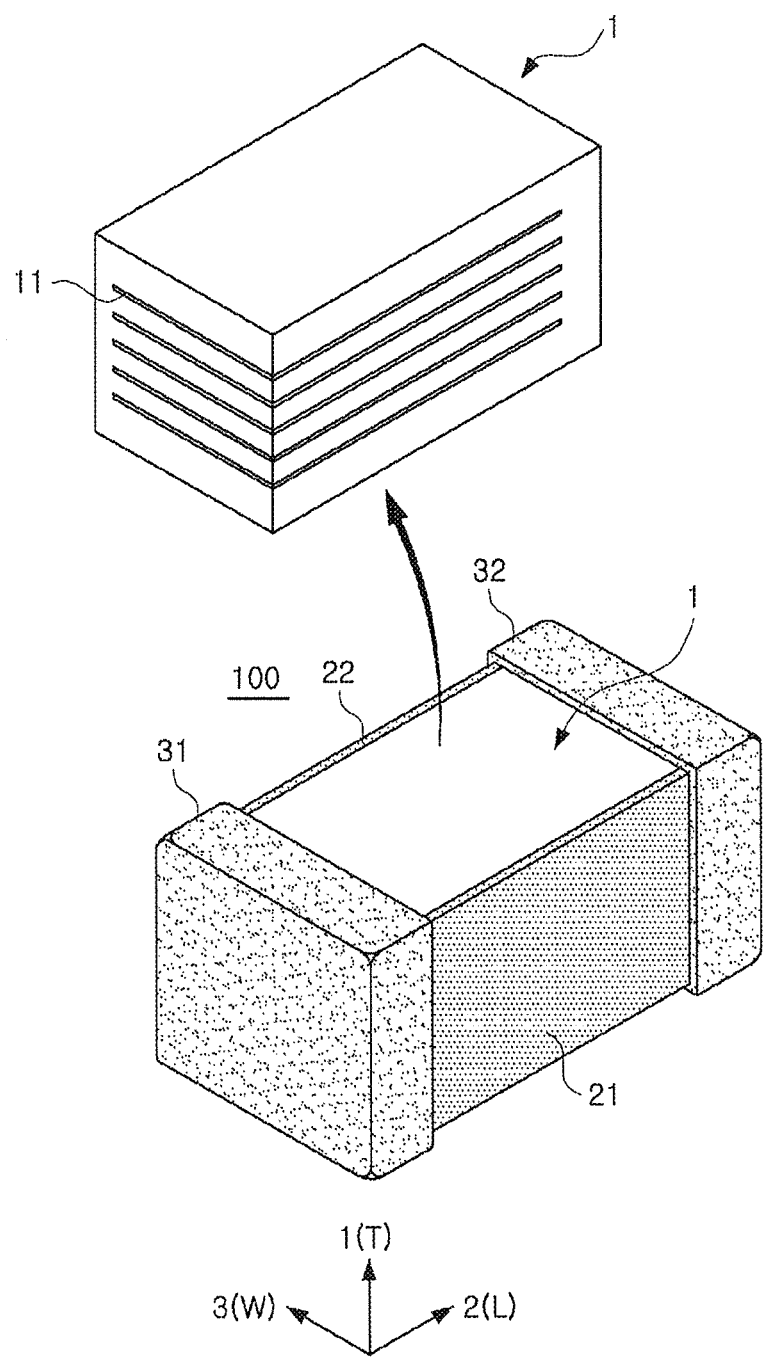
FIG. 1 is a schematic perspective view of a multilayer electronic component according to an exemplary embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region, or wafer (substrate), is referred to as being "on," "connected to," or "coupled to" another element, it can be directly "on," "connected to,", or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another member, component, region, layer, or section. Thus, a first member, component, region, layer, or section discussed below could be termed a second member, component, region, layer, or section without departing from the teachings of the exemplary embodiments.

Spatially relative terms, such as "above," "upper," "below," "lower," and the like, may be used herein for ease of description to describe one element's positional relationship relative to one or more other element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the devices, elements, or figures. The device may be otherwise oriented (rotated 90 degrees or at other orientations) and the spatially relative descriptors used herein may be interpreted accordingly.

The terminology used herein describes particular illustrative embodiments only, and the present disclosure is not limited thereby. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present disclosure will be described with reference to schematic views illustrating embodiments of the present disclosure. In the drawings, components having ideal shapes are shown. However, variations from these ideal shapes, for example due to variability in manufacturing techniques and/or tolerances, also fall within the scope of the disclosure. Thus, embodiments of the present disclosure should not be construed as being limited to the particular shapes of regions shown herein, but should more generally be understood to include changes in shape resulting from manufacturing methods and processes. The following embodiments may also be constituted by one or a combination thereof.

The present disclosure describes a variety of configurations, and only illustrative configurations are shown herein. However, the disclosure is not limited to the particular illustrative configurations presented herein, but extends to other similar/analogous configurations as well.

Multilayer Electronic Component

FIG. 1 is a schematic perspective view of a multilayer electronic component according to an exemplary embodiment.

Referring to FIG. 1, the multilayer electronic component 100 according to an exemplary embodiment may include a body 1 including a multilayer structure in which first and second internal electrode patterns are alternately stacked and containing a dielectric material, first and second side parts 21 and 22 disposed on outer surfaces of the body that face each other (or are opposite to each other) in a third direction of the body 1, and first and second external electrodes 31 and 32 disposed on outer surfaces of the body to face each other (or be disposed on opposing surfaces of the body 1) in a second direction of the body 1.

The body 1 may have six outer surfaces including first and second surfaces opposing each other in a first direction, third and fourth surfaces opposing each other in the second direction, and fifth and sixth surfaces opposing each other in the third direction. The body 1 may have a substantially hexahedral shape, but is not limited thereto.

Referring to FIG. 1, the first direction refers to a thickness (T) direction of the body 1, the second direction refers to a length (L) direction of the body 1, and the third direction refers to a width (W) direction of the body 1. In this case, the first and second surfaces of the body 1 opposing each other in the first direction of the body 1 may be upper and lower surfaces of the body, respectively, but are not limited thereto.

Referring to FIG. 1, the first and second side parts 21 and 22 may be disposed, respectively, on the fifth and sixth surfaces opposing each other in the third direction among the outer surfaces of the body 1. The first side part 21 may be disposed to contact the first internal electrode patterns (e.g., shown at 11) exposed onto the fifth surface of the body 1, and the second side part 22 may be disposed to contact the second internal electrode patterns exposed onto the sixth surface of the body 1. The first and second side parts 21 and 22 may be disposed in order to prevent end portions of the first and second internal electrode patterns exposed onto the outer surfaces of the body 1 from being damaged due to physical or chemical stress.

According to the related art, in a case in which a multilayer structure including first and second internal electrode patterns is printed into a body, the first and second internal electrode patterns are not exposed onto the outer surface of the body except for the outer surfaces of the body on which the first and second external electrodes are disposed. Therefore, in the devices of the related art, there is no need to introduce separate first and second side parts such as the first and second side parts 21 and 22 shown in FIG. 1.

However, in the multilayer electronic component according to an exemplary embodiment shown in FIG. 1, the first internal electrode patterns (shown at numeral 11) may not only be exposed onto the outer surface of the body 1 on which the first external electrode 31 is disposed, but may also be exposed onto the fifth surface of the body 1 (on which the first side part 21 is disposed). In addition, the second internal electrode patterns may not only be exposed onto the outer surface of the body 1 on which the second external electrode 32 is disposed, but may also be exposed onto the sixth surface of the body 1 (on which the second side part 22 is disposed).

Therefore, the first and second side parts 21 and 22 used for preventing the end portions of the first and second internal electrode patterns from being deformed due to external stress may be advantageously provided.

The first and second side parts 21 and 22 are not necessarily disposed to cover the entire fifth and sixth surfaces of the body 1. That is, it may be sufficient that the first and second side parts 21 and 22 are disposed to cover the end portions of the first and second internal electrode patterns exposed onto the outer surfaces of the body 1 on the fifth and sixth surfaces of the body 1.

Referring to FIG. 1, the first and second external electrodes 31 and 32 may be disposed on the third and fourth surfaces of the body 1 opposing each other in the second direction among the outer surfaces of the body 1.

The first external electrode 31 may be electrically connected to the first internal electrode patterns within the body 11, and the second external electrode 32 may be electrically connected to the second internal electrode patterns within the body 1.

The first and second external electrodes 31 and 32 may be formed of a material having excellent electrical conductivity, and may serve to electrically connect various patterns as well as the first and second internal electrode patterns and external devices to each other. Therefore, the first and second external electrodes 31 and 32 may contain a material having excellent electrical conductivity, such as Ni, Ag, or Pd, but are not limited thereto.

Next, FIGS. 2A through 2F are schematic cross-sectional views of respective outer surfaces of a body 1 according to an exemplary embodiment. Here, internal electrode patterns that are exposed onto the outer surfaces of the body 1 are denoted by a solid line, and internal electrode patterns that are not exposed onto the outer surfaces of the body 1 are denoted by a two-dot chain line.

In detail, FIGS. 2A through 2F are cross-sectional views of the first to sixth outer surfaces of the body 1, respectively.

Figure 2A:
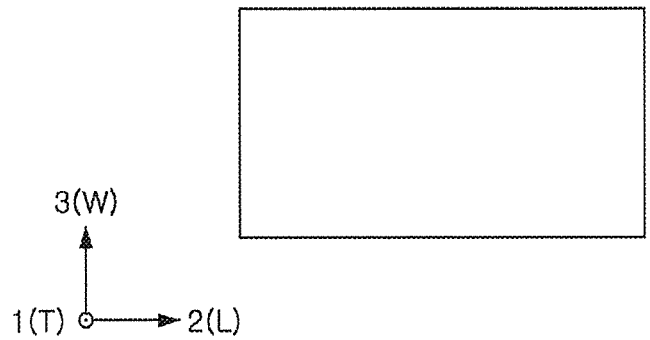
FIGS. 2A through 2F are schematic cross-sectional views of respective outer surfaces of a body of a multilayer electronic component such as that shown in FIG. 1.
Figure 2B:
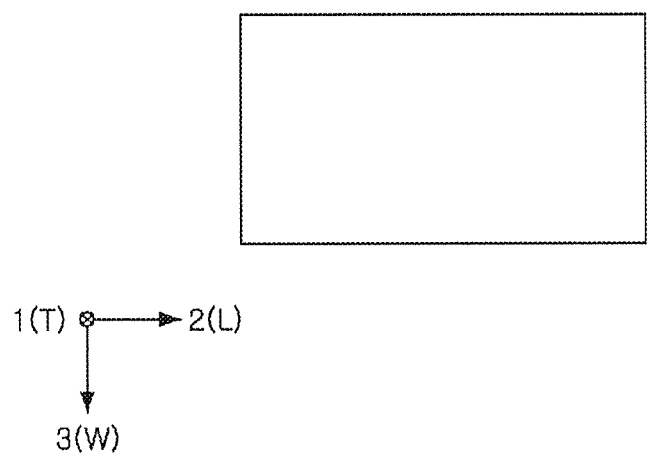

First, FIGS. 2A and 2B illustrate the first and second surfaces of the body 1, respectively. The first and second surfaces of the body 1 may be the upper and lower surfaces of the body 1, respectively. The upper and lower surfaces of the body 1 are upper and lower cover layers of the body 1 and serve to protect the internal electrode patterns having a multilayer structure within the body 1 from external impact. The upper and lower surfaces may be formed by stacking ten or more ceramic sheets on which the internal electrode patterns are not formed, as an example.

Figure 2C:
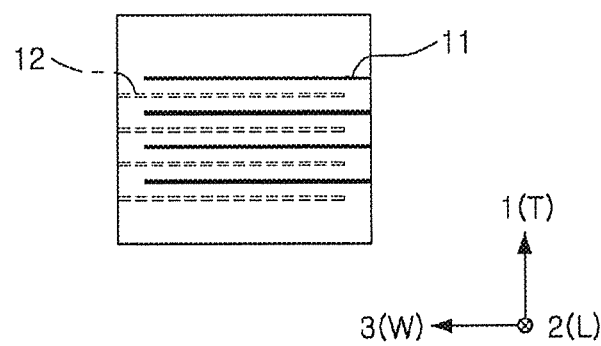

Next, FIG. 2C illustrates the third surface of the body 1. The third surface of the body 1 may be the outer surface of the body on which the first external electrode 31 is disposed. As illustrated in FIG. 2C, the first internal electrode patterns 11 may be exposed onto the third surface of the body 1. The first internal electrode patterns 11 may be continuously exposed from a point, spaced apart from one edge (or one end portion) of the third surface of the body 1 by a predetermined distance, to the other opposite edge (or opposite end portion) of the third surface of the body 1 extended in the third direction of the body 1. In this manner, the first internal electrode patterns 11 secure a maximum area for significantly increasing a capacitance value of the capacitor by ensuring that the first internal electrode patterns 11 overlap the second internal electrode patterns 12 within the body 1. The first internal electrode patterns 11 are not exposed onto the sixth surface of the body 1 onto which the second internal electrode patterns 12 are exposed (the sixth surface of the body 1 being the surface having the second side part 22 disposed thereon). Similarly, the second internal electrode patterns 12 are not exposed onto the fifth surface of the body 1 onto which the first internal electrode patterns 11 are exposed (the fifth surface of the body 1 being the surface having the first side part 21 disposed thereon). Therefore, a risk that a short circuit between the first and second internal electrode patterns 11 and 12 will be generated on the fifth surface of the body 1 (i.e., the surface onto which the first internal electrode patterns 11 are exposed) may be completely prevented.

Meanwhile, a distance by which the first internal electrode patterns 11 are spaced apart from one edge (or end portion) of the third surface of the body 1 may be set to be equal to a distance by which the first internal electrode patterns 11 are spaced apart from the sixth surface of the body 1. In a case in which only this condition is satisfied, when the spacing distance becomes minimized, an overlapping region as large as possible between the first and second internal electrode patterns 11 and 12 may be secured, and thus capacitance as large as possible may be secured.

Figure 2D:
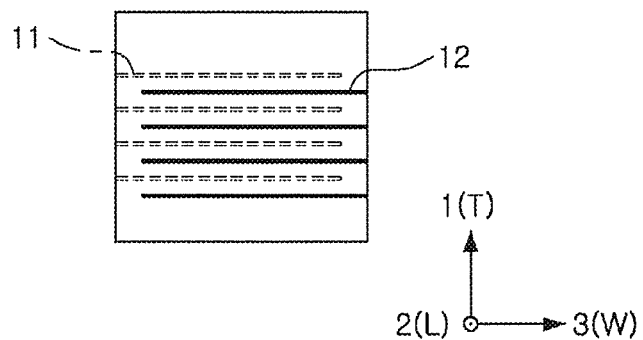

Next, FIG. 2D illustrates the fourth surface of the body 1. The fourth surface of the body 1 may be the outer surface of the body 1 on which the second external electrode 32 is disposed. As illustrated in FIG. 2D, the second internal electrode patterns 12 may be exposed onto the fourth surface of the body 1. The second internal electrode patterns 12 may be continuously exposed from a point, spaced apart from one edge (or one end portion) of the fourth surface of the body 1 by a predetermined distance, to the other opposite edge (or opposite end portion) of the fourth surface of the body 1 extended in the third direction of the body 1. In this manner, the second internal electrode patterns 12 secure a maximum area for significantly increasing a capacitance value of the capacitor by ensuring that the second internal electrode patterns 12 overlap the first internal electrode patterns 11 within the body 1. The second internal electrode patterns 12 are not exposed onto the fifth surface of the body 1 onto which the first internal electrode patterns 11 are exposed (the fifth surface of the body 1 being the surface having the first side part 21 disposed thereon). Similarly, the first internal electrode patterns 11 are not exposed onto the sixth surface of the body 1 onto which the second internal electrode patterns 12 are exposed (the sixth surface of the body 1 being the surface having the second side part 22 disposed thereon) Therefore, a risk that a short circuit between the first and second internal electrode patterns 11 and 12 will be generated on the sixth surface of the body 1 (i.e., the surface onto which the second internal electrode patterns 12 are exposed) may be completely prevented.

Meanwhile, a distance by which the second internal electrode patterns 12 are spaced apart from one edge (or end portion) of the fourth surface of the body 1 may be set to be equal to a distance by which the second internal electrode patterns 12 are spaced apart from the fifth surface of the body 1. In a case in which only this condition is satisfied, when the spacing distance becomes minimized, an overlapping region as large as possible between the first and second internal electrode patterns 11 and 12 may be secured, and thus capacitance as large as possible may be secured.

Figure 2E:
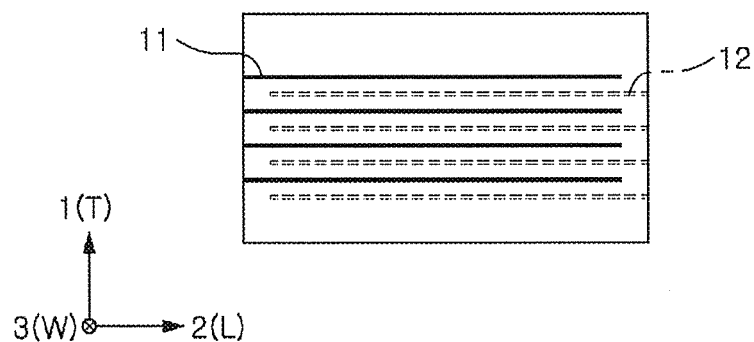

Next, FIG. 2E illustrates the fifth surface of the body 1. The fifth surface of the body 1 may be the outer surface of the body on which the first side part 21 is disposed. As illustrated in FIG. 2E, only the first internal electrode patterns 11 (from among the first and second internal electrode patterns 11 and 12) may be exposed onto the fifth surface of the body 1. Thus, the second internal electrode patterns 12 may not be exposed onto the fifth surface of the body 1. Since only the first internal electrode patterns 11 (from among the first and second internal electrode patterns 11 and 12) are exposed onto the fifth surface of the body 1, there is no risk that an unintended short circuit between the first and second internal electrode patterns 11 and 12 will be generated on the fifth surface.

For example, in a case in which a cutting process is performed along the fifth surface of the body 1 (for example, in a case in which a multilayer bar in which first and second ceramic green sheets having first and second internal electrode base patterns printed thereon are alternately stacked is cut into individualized bodies along the fifth surface), when both of the first and second internal electrode patterns 11 and 12 are alternately exposed onto the fifth surface of the body 1, a phenomenon that the first and second internal electrode patterns 11 and 12 are pushed due to stress when the cutting process is performed may occur, and thus there is a risk of a short circuit between the first and second internal electrode patterns 11 and 12.

However, in the multilayer electronic component according to an exemplary embodiment described herein, since only the first internal electrode patterns 11 are exposed onto the fifth surface of the body 1, even in a case in which the first and second internal electrode patterns 11 and 12 are pushed due to stress when the cutting process is performed, there is no risk of a short circuit between the first and second internal electrode patterns 11 and 12. In addition, in the multilayer electronic component according to an exemplary embodiment, since only the first internal electrode patterns 11 are exposed onto the fifth surface of the body 1, a distance between the first internal electrode patterns 11 in the thickness direction of the body 1 may be larger than a distance between the first and second internal electrode patterns 11 and 12 in a case in which the first and second internal electrode patterns 11 and 12 are alternately exposed onto the fifth and sixth surfaces of the body 1 according to the related art. Therefore, even in the case in which the first and second internal electrode patterns 11 and 12 are pushed due to stress when the cutting process is performed, there is no risk of a short circuit between the first and second internal electrode patterns 11 and 12.

In addition, referring to FIG. 2E, the first internal electrode patterns 11 may be extended from one edge (or one end portion) of the fifth surface of the body 1 only to a point spaced apart by a predetermined spacing distance from the other opposing edge (or end portion) of the fifth surface of the body 1 extended in the second direction of the body 1. That is, a length by which the first internal electrode patterns 11 are extended in the second direction of the body 1 may be shorter than a length by which the fifth surface of the body 1 is extended in the second direction.

The predetermined spacing distance is generally set to be larger than a length by which the second external electrode 32, disposed on the fourth surface of the body 1, is extended onto the fifth surface of the body 1, in order to prevent electrical connection between the first internal electrode patterns 11 and the second external electrode 32 on the fifth surface of the body 1.

Figure 2F:
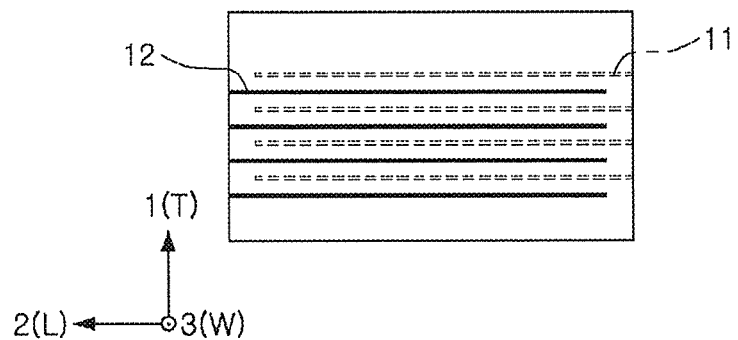

Next, FIG. 2F illustrates the sixth surface of the body 1. The sixth surface of the body 1 may be the outer surface of the body 1 on which the second side part 22 is disposed. As illustrated in FIG. 2F, only the second internal electrode patterns 12 (from among the first and second internal electrode patterns 11 and 12) may be exposed onto the sixth surface of the body 1. Thus, the first internal electrode patterns 11 may not be exposed onto the sixth surface of the body 1. Since only the second internal electrode patterns 12 (from among the first and second internal electrode patterns 11 and 12) are exposed onto the sixth surface of the body 1, there is no risk that an unintended short circuit between the first and second internal electrode patterns 11 and 12 will be generated on the sixth surface.

In addition, referring to FIG. 2F, the second internal electrode patterns 12 may be extended from one edge (or one end portion) of the sixth surface of the body 1 only to a point spaced apart by a predetermined spacing distance from the other opposing edge (or end portion) of the sixth surface of the body 1 extended in the second direction of the body 1. That is, a length by which the second internal electrode patterns 12 are extended in the second direction of the body 1 may be shorter than a length by which the sixth surface of the body 1 is extended in the second direction.

The predetermined spacing distance is generally set to be larger than a length by which the first external electrode 31, disposed on the third surface of the body 1, is extended onto the sixth surface of the body 1, in order to prevent electrical connection between the second internal electrode patterns 12 and the first external electrode 31 on the sixth surface of the body 1.

Figure 3:
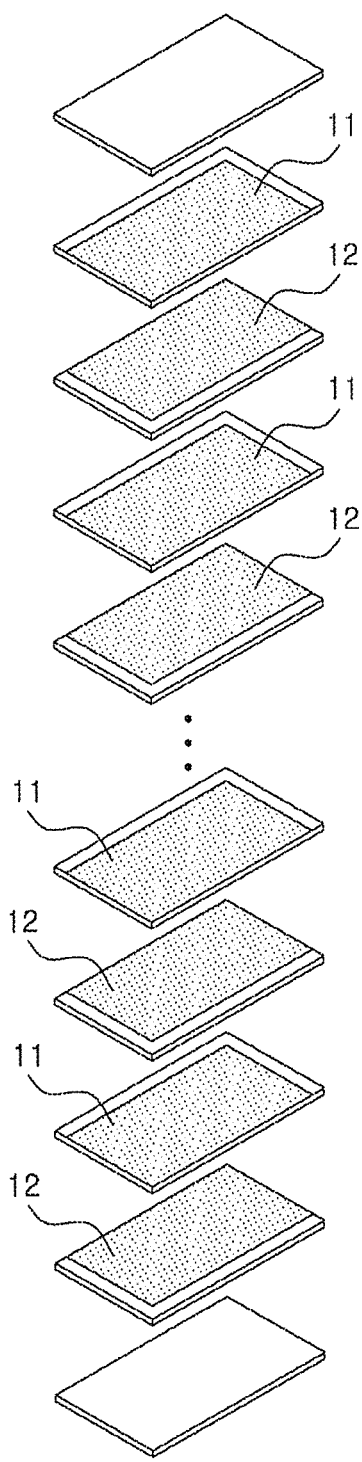
FIG. 3 is an exploded perspective view showing internal electrode patterns within the body of a multilayer electronic component such as that shown in FIG. 1.

FIG. 3 is an exploded perspective view schematically illustrating the first and second internal electrodes 11 and 12 that are alternately stacked.

Referring to FIG. 3, the first internal electrode patterns 11 may be disposed to be exposed onto the fifth surface of the body 1 on which the first side part 21 is disposed and the third surface of the body 1 on which the first external electrode 31 is disposed among the outer surfaces of the body 1. Since the first internal electrode patterns 11 are exposed onto the fifth surface of the body 1 as well as the third surface of the body 1, the first internal electrode patterns 11 may be vulnerable to external physical or chemical stress, but maximum capacitance may be secured. Meanwhile, in order to address the fact that the end portions of the first internal electrode patterns 11 exposed onto the fifth surface of the body 1 are vulnerable to physical or chemical stress, the first side part 21 may be disposed to contact the end portions of the first internal electrode patterns 11 exposed onto the fifth surface of the body 1.

In addition, the second internal electrode patterns 12 may have the same shape as that of the first internal electrode patterns 11, but may be patterns disposed to be spaced apart from the first internal electrode patterns 11 by predetermined intervals in the second and third directions of the body 1.

The second internal electrode patterns 12 may be disposed to be exposed onto the sixth surface of the body 1 on which the second side part 22 is disposed and the fourth surface of the body 1 on which the second external electrode 32 is disposed among the outer surfaces of the body 1. Since the second internal electrode patterns 12 are exposed onto the sixth surface of the body 1 as well as the fourth surface of the body 1, the second internal electrode patterns 12 may be vulnerable to external physical or chemical stress, but maximum capacitance may be secured.

Meanwhile, in order to address the fact that the end portions of the second internal electrode patterns 12 exposed onto the sixth surface of the body 1 are vulnerable to physical or chemical stress, the second side part 22 may be disposed to contact the end portions of the second internal electrode patterns 12 exposed onto the sixth surface of the body 1.

Figure 4:
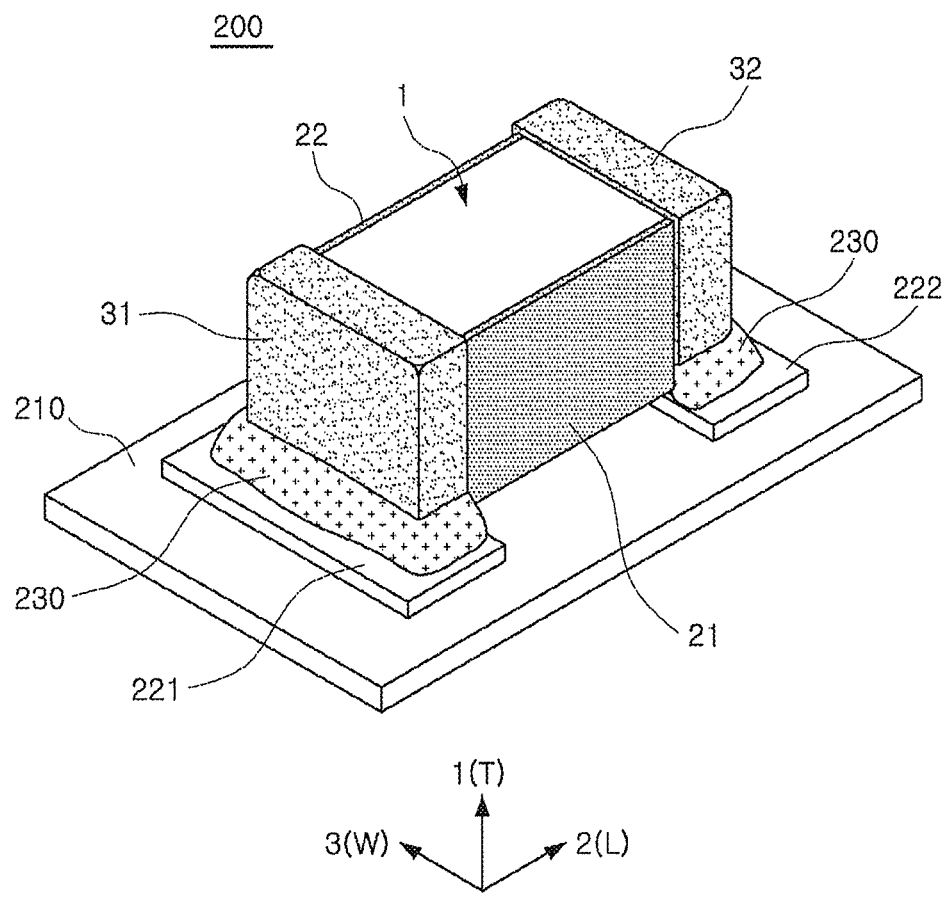
FIG. 4 is a schematic perspective view of a mounting board on which the multilayer electronic component of FIG. 1 is mounted.

FIG. 4 illustrates a mounting board on which the multilayer electronic component according to an exemplary embodiment is mounted.

Referring to FIG. 4, the mounting board 200 may include a board 210 on which the multilayer electronic component 100 is mounted, and first and second electrode pads 221 and 222 formed on the board 210 to be spaced apart from each other.

Here, the multilayer electronic component 100 may be electrically connected to the board 210 by solders 230 such that the first and second external electrodes 31 and 32 thereof are positioned on the first and second electrode pads 221 and 222, respectively, and electrically contact the first and second electrode pads 221 and 222, respectively.

Method of Manufacturing Multilayer Electronic Component

Hereinafter, a method of manufacturing a multilayer electronic component according to an exemplary embodiment will be described with reference to FIGS. 5A, 5B, 6A, 6B, and 7 through 9.

Figure 5A:
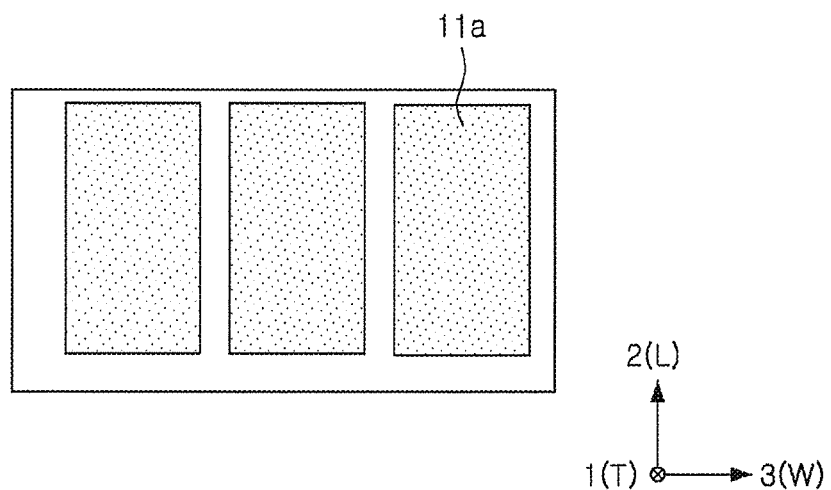
FIGS. 5A and 5B are views illustrating a first internal electrode base pattern used in a method of manufacturing a multilayer electronic component such as that shown in FIG. 1.
Figure 5B:
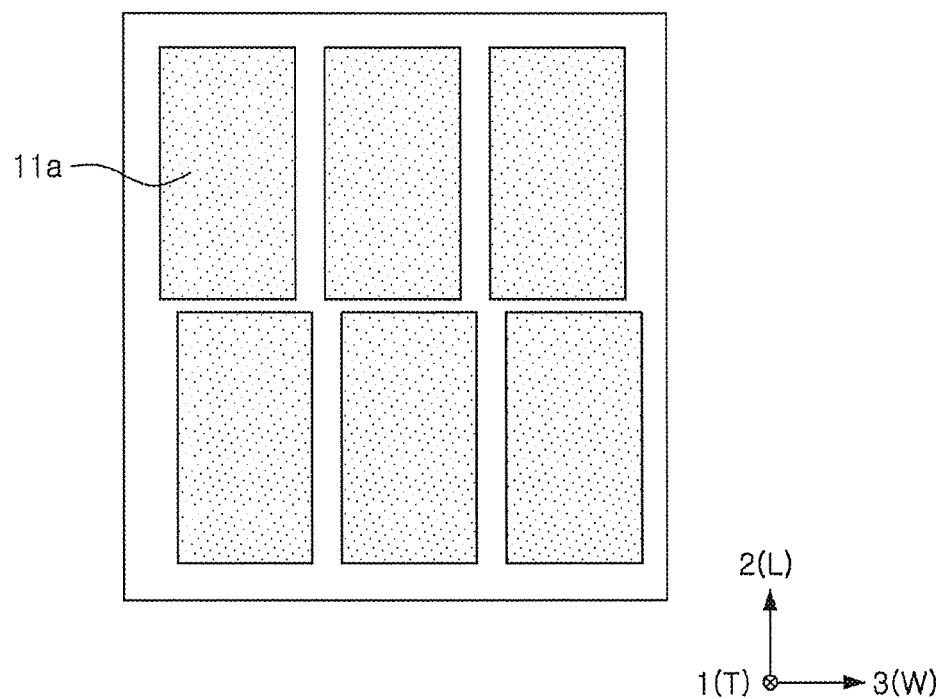

First, FIGS. 5A and 5B illustrate a first ceramic green sheet on which a first internal electrode base pattern 11a is printed.

Referring to FIG. 5A, a slurry containing a powder having a dielectric property, a binder, and a solvent may be applied onto a substrate such as a carrier film to form a first ceramic green sheet, and the first internal electrode base pattern 11a may be printed on the first ceramic green sheet.

The powder having the dielectric property, which is a high-k material, may be a barium titanate based material, a lead composite perovskite based material, a strontium titanate based material, or the like, and may preferably be a barium titanate powder, but is not limited thereto.

The purpose of the binder may be to secure dispersibility and viscosity of the powder having the dielectric property, and viscosity of the slurry may be adjusted by adjusting an amount of the binder. The binder may be an organic binder resin, for example, a resin such as ethyl cellulose, polyvinyl butyral, and the like, but is not limited thereto.

The first internal electrode base pattern 11a may be formed of a conductive metal having excellent electrical conductivity, and may contain one or more selected from the group consisting of Ag, Ni, Cu, Pd, and alloys thereof, but is not limited thereto.

The first internal electrode base pattern 11A may include one, two, or more strip shapes spaced apart from each other by a predetermined distance in a width direction of the first ceramic green sheet. Each strip shape may be a square shape having lengths in the length direction and the width direction that are the same as (or equal to) each other, or a rectangular shape having a length in the length direction that is longer than a length in the width direction, but is not limited thereto.

In addition, the first internal electrode base pattern 11a may be disposed to be offset from a central portion of the first ceramic green sheet in the length direction and the width direction. For example, a center of the first internal electrode base pattern may be offset from a center of the first ceramic green sheet in the length and width directions. In this case, a second ceramic green sheet on which a second internal electrode base pattern is printed may be more easily stacked on the first ceramic green sheet.

In addition, the first internal electrode base pattern 11a may not be printed on (e.g., may be spaced part from) one edge (or one end portion) of the first ceramic green sheet in a length direction of the first ceramic green sheet. In this case, the first internal electrode base pattern 11a may not be exposed to an outer surface of a body (e.g., body 1) formed of a stack of ceramic green sheets including the first ceramic green sheet, and on which the second external electrode 32 is disposed without performing an additional cutting process later.

In addition, referring to FIG. 5B, the first internal electrode base pattern 11a may have a plurality of strip shapes that are not only arranged at regular intervals linearly in the width direction, but are also arranged to be spaced apart from each other by a predetermined interval in a two-dimensional array extending in the length direction of the first ceramic green sheet.

Figure 6A:
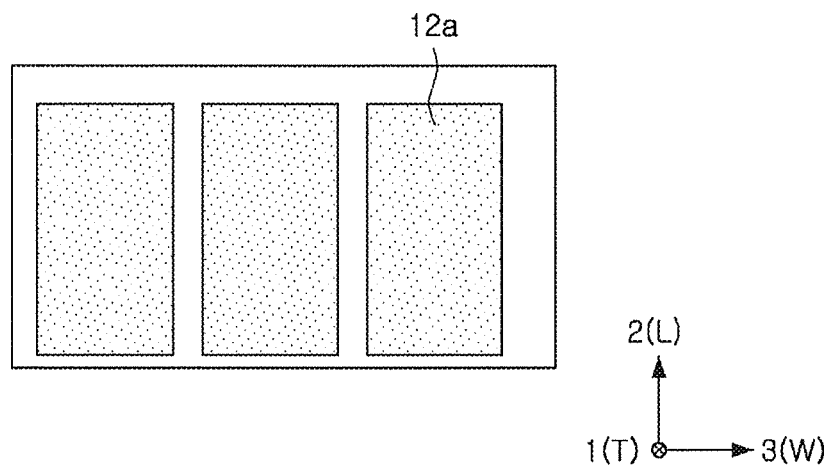
FIGS. 6A and 6B are views illustrating a second internal electrode base pattern used in the method of manufacturing a multilayer electronic component such as that shown in FIG. 1.

Referring to FIG. 6A, a second internal electrode base pattern 12a may be printed on a second ceramic green sheet.

The second internal electrode base pattern 12a may be printed on the second ceramic green sheet at a position that is substantially the same as the position at which the first internal electrode base pattern 11a is printed on the first ceramic green sheet. In this case, when the first and second ceramic green sheets are stacked, a plurality of sheets need to be stacked to be misaligned with each other by predetermined intervals in the width direction and the length direction.

Alternatively, the second internal electrode base pattern 12a may be printed on the second ceramic green sheet at a position that is spaced apart from the position at which the first internal electrode base pattern 11a is printed on the first ceramic green sheet by predetermined intervals in the width direction and the length direction. In this case, a plurality of sheets may be stacked so that both end portions of the first and the second ceramic green sheets in the width direction and both end portions of the first and the second ceramic green sheets in the length direction coincide with each other.

Figure 6B:
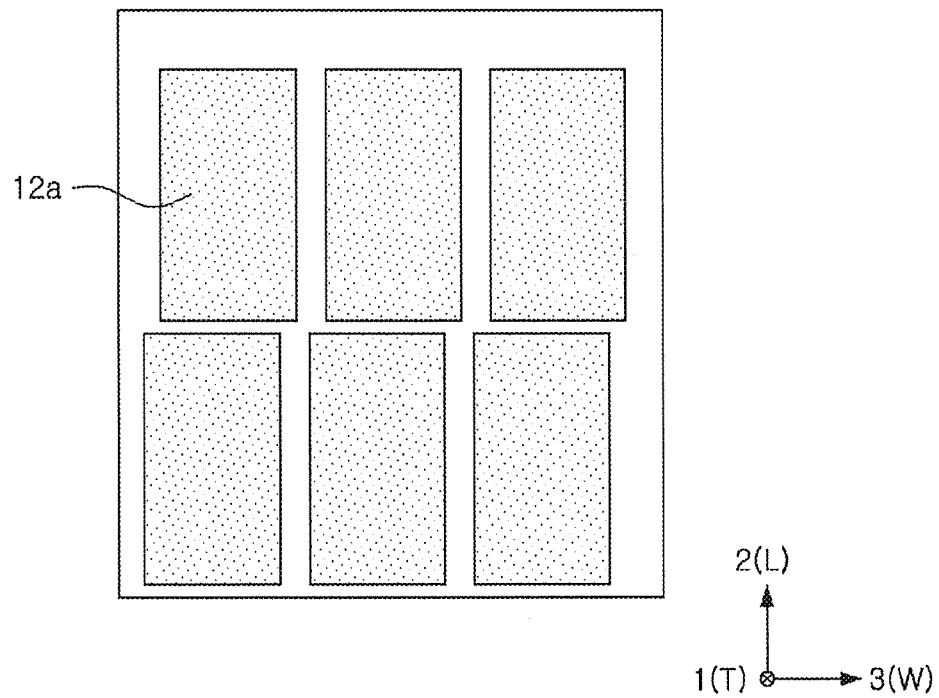

Meanwhile, referring to FIG. 6B, the second internal electrode base pattern 12a may have a plurality of strip shapes that are not only arranged at regular intervals linearly in the width direction, but are also arranged to be spaced apart from each other by a predetermined interval in a two-dimensional array extending in the length direction of the second ceramic green sheet.

Figure 7:
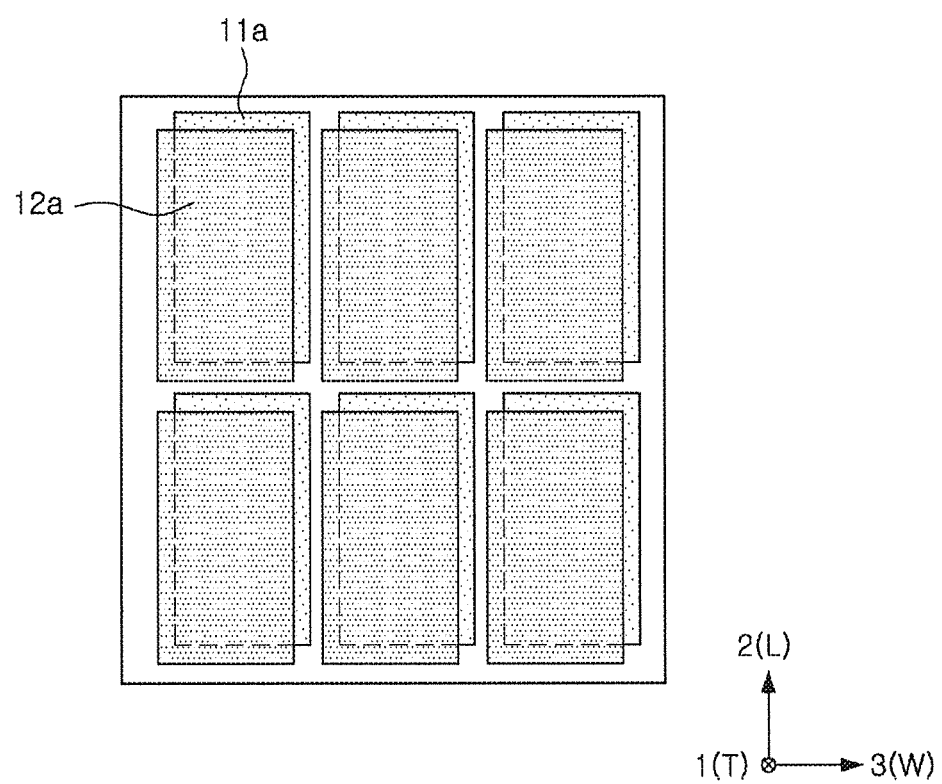
FIG. 7 is a top view showing relative positions of internal electrode base patterns in a stack of first and second ceramic green sheets used in the method of manufacturing a multilayer electronic component such as that shown in FIG. 1.

Next, referring to FIG. 7, a top view of a stack of first and second ceramic green sheets on which the first and second internal electrode base patterns 11a and 12a are disposed is illustrated.

In this case, when viewing a multilayer bar in which the first ceramic green sheets having the first internal electrode base patterns 11a printed thereon and the second ceramic green sheets having the second internal electrode base patterns 12a printed thereon are stacked on top of each other, it may be appreciated that the first and second internal electrode base patterns 11a and 12a that have substantially the same shape alternately overlap each other to be misaligned with each other by predetermined intervals in the width direction and the length direction.

Although only a case in which the first and second internal electrode base patterns 11a and 12a alternately overlap each other to be misaligned with each other by the same interval in the width direction and the length direction has been illustrated in FIG. 7, a misaligned level may be appropriately selected in consideration of a manufacturing process or required performance of a chip. In this case, the larger the overlapping region between the first and second internal electrode base patterns 11a and 12a, the larger the capacitance of the resulting multilayer electronic component.

Figure 8:
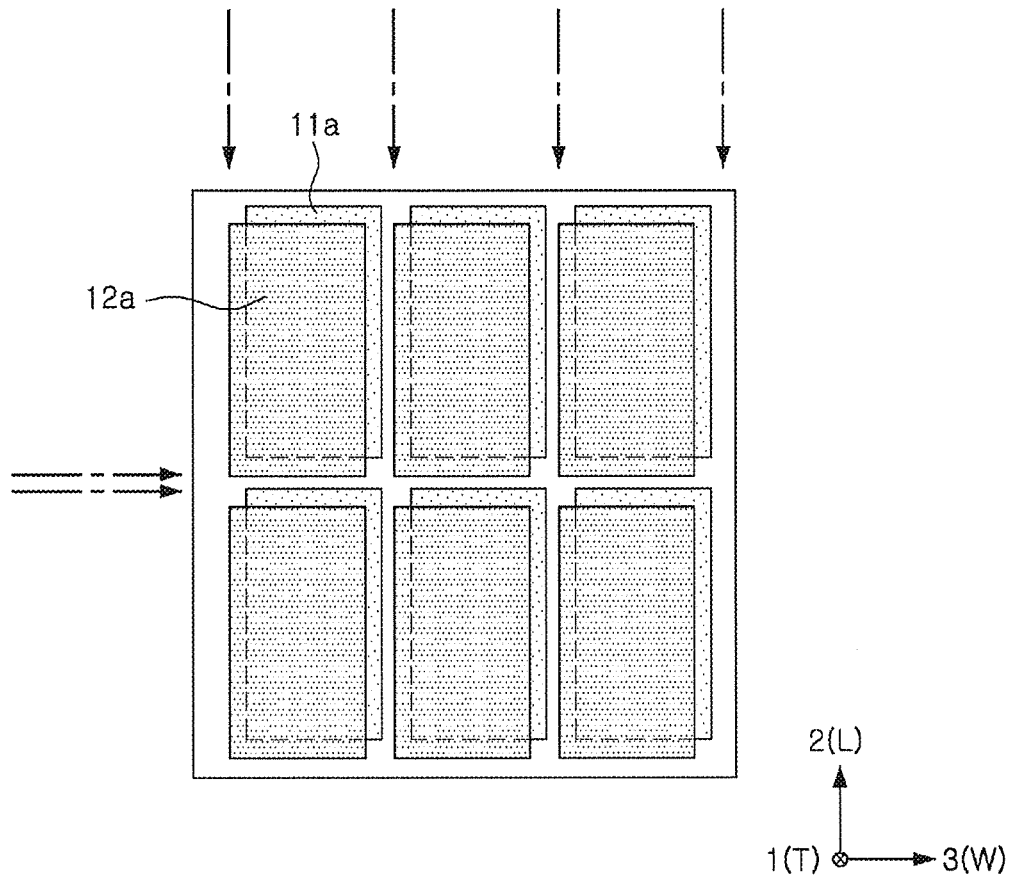
FIG. 8 is a top view showing cutting lines or cutting surfaces on a multilayer bar used in the method of manufacturing a multilayer electronic component such as that shown in FIG. 1.

In addition, FIG. 8 is a top perspective view illustrating cutting lines or cutting surfaces of a multilayer bar in which the first ceramic green sheets having the first internal electrode base patterns 11a printed thereon and the second ceramic green sheets having the second internal electrode base patterns 12a printed thereon are stacked.

The cutting lines or cutting surfaces may be formed along end portions (or edge portions) of strips within the first internal electrode base pattern 11a and end portions of strips within the second internal electrode base pattern 12a. Therefore, end portions of first internal electrode patterns 11a may be exposed onto surfaces of individualized bodies on which first external electrodes (e.g., 31) are disposed and surfaces of the individualized bodies on which first side parts (e.g., 21) are disposed among outer surfaces of the individualized bodies, and end portions of second internal electrode patterns 12a may be exposed onto surfaces of the individualized bodies on which second external electrodes (e.g., 32) are disposed and surfaces of the individualized bodies on which second side parts (e.g., 22) are disposed among the outer surfaces of the individualized bodies.

The multilayer bar in which the first and second ceramic green sheets are stacked may be cut into individualized bodies each including a multilayer structure in which first and second internal electrode patterns 11 and 12 are alternately stacked and containing a dielectric material through the cutting process along the cutting lines or cutting surfaces. The first internal electrode patterns 11 within the body may be exposed onto outer surfaces of the body 1 except for a surface of the body 1 on which the second external electrode 32 connected to the second internal electrode patterns 12 is to be disposed, and the second internal electrode patterns 12 within the body may be exposed onto outer surfaces of the body except for a surface of the body on which the first external electrode 31 connected to the first internal electrode patterns 11 is to be disposed.

In addition, a process of cutting the multilayer bar in which the first and second ceramic green sheets are stacked will be described in detail. The first and second internal electrode base patterns 11a and 12a within the multilayer bar may be cut by different cutting surfaces. In other words, a cutting surface of the first internal electrode base pattern 11a may not meet the second internal electrode base pattern 12a, and a cutting surface of the second internal electrode base pattern 12a may not meet the first internal electrode base pattern 11a.

As a result, a negative effect that a short circuit between the first and second internal electrode patterns 11a and 12a is generated due to the phenomenon that the first and second internal electrodes 11a and 12a are pushed in a process of cutting the multilayer bar into individual chips may be prevented.

In this case, when the first internal electrode base pattern 11a is cut, apart of a region in which the first and second internal electrode base patterns 11a and 12a do not overlap each other (e.g., between adjacent strip shapes in the first internal electrode base pattern 11a) may be cut. It may be preferable that the first internal electrode base pattern 11a is cut along end portions of the strip shapes in the first internal electrode base pattern 11a, in consideration of efficiency in a manufacturing process and economic efficiency. This may also be applied to a case of cutting the second internal electrode base pattern 12a.

Figure 9:
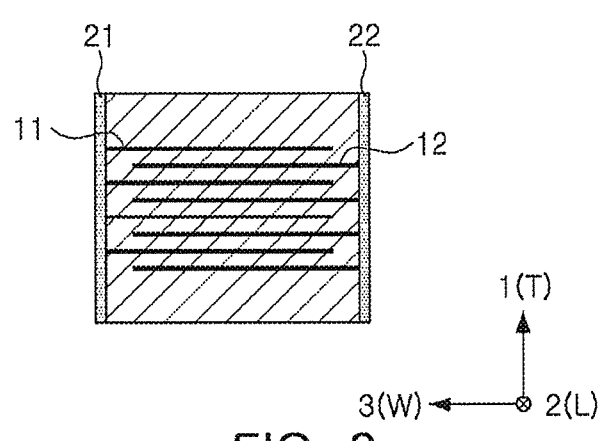
FIG. 9 is a side view illustrating first and second side parts disposed on outer surfaces of the body of a multilayer electronic component such as that shown in FIG. 1.

Referring to FIG. 9, the first and second side parts 21 and 22 may be disposed, respectively, on the fifth and sixth surfaces of the body 1 among the outer surfaces of the body 1. Only the first internal electrode patterns 11, among the first and second internal electrode patterns 11 and 12, may be exposed onto the fifth surface of the body 1, and only the second internal electrode patterns 12, among the first and second internal electrode patterns 11 and 12, may be exposed onto the sixth surface of the body 1. The first and second side parts 21 and 22 may be formed by applying a slurry to protect the end portions of the first and second internal electrode patterns 11 and 12 exposed onto the fifth and sixth surfaces of the body 1, respectively, from physical or chemical stress. Since the first and second side parts 21 and 22 are disposed on only the fifth and sixth surfaces of the body 1, respectively, by selectively applying the slurry onto only the fifth and sixth surfaces of the body 1, thicknesses in the first and second surfaces of the body 1 may not be affected by the application of the slurry.

Meanwhile, in order to selectively apply the slurry onto only the fifth and sixth surfaces of the body 1, for example, a method may include attaching detachable films onto the outer surfaces of the body 1 except for the fifth and sixth surfaces of the body 1, dipping the body 1 into the slurry, and removing the detachable films attached onto the outer surfaces of the body 1. However, a method of applying the slurry onto only the fifth and sixth surfaces of the body 1 is not limited thereto, and other appropriate methods can be used.

The slurry forming the first and second side parts 21 and 22 may contain the powder having the dielectric property, the binder, and the organic solvent.

In this case, the first side part 21 may be disposed by applying a first slurry containing a solvent compatible with a binder contained in an electrode paste forming the second internal electrode base pattern 12 onto the outer surface of the body 1, and the second side part 22 may be disposed by applying a second slurry containing a solvent compatible with a binder contained in an electrode paste forming the first internal electrode base pattern 11 onto the outer surface of the body 1. This structure is possible since the first side part 21 and the second internal electrode patterns 12 do not contact each other and the second side part 22 and the first internal electrode pattern 11 do not contact each other.

Next, the first and second external electrodes 31 and 32 may be disposed on the third and fourth surfaces of the body 1, respectively. The first external electrode 31 may be electrically connected to the first internal electrode patterns 11, and may be disposed to be extended to some regions of the first, second, fifth, and sixth surfaces of the body 1 adjacent to the third surface of the body 1, in addition to the third surface of the body 1. Likewise, the second external electrode 32 may be electrically connected to the second internal electrode patterns 12, and may be disposed to be extended to some regions of the first, second, fifth, and sixth surfaces of the body 1 adjacent to the fourth surface of the body 1, in addition to the fourth surface of the body 1.

As set forth above, according to an exemplary embodiment, a multilayer electronic component is provided that has capacitance that is increased by significantly increasing an active region contributing to generation of capacitance. The active region is increased by strategically disposing internal electrode patterns of the multilayer electronic component. A method of manufacturing the same is also provided.

According to an exemplary embodiment, a multilayer electronic component is provided in which short circuits between internal electrodes alternately formed between a plurality of sheets is prevented. A method of manufacturing the same is also provided.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
   a body including a multilayer structure in which first and second internal electrode patterns are alternately stacked, containing a dielectric material, and having outer surfaces including first and second outer surfaces opposing each other in a first direction, third and fourth outer surfaces opposing each other in a second direction, and fifth and sixth outer surfaces opposing each other in a third direction;
   first and second external electrodes disposed, respectively, on the third and fourth outer surfaces among the outer surfaces of the body, and electrically connected to the first and second internal electrode patterns, respectively; and
   first and second side parts disposed, respectively, on the fifth and sixth outer surfaces among the outer surfaces of the body,
   wherein the first internal electrode patterns are exposed to the third outer surface and the fifth outer surface of the body on which the first external electrode and the first side part are disposed, respectively,
   the second internal electrode patterns are exposed to the fourth outer surface and the sixth outer surface of the body on which the second external electrode and the second side part are disposed, respectively,
   both the first side part and the second external electrode are directly disposed on the fifth outer surface, and both the second side part and the first external electrode are directly disposed on the sixth outer surface, and
   a length of each of the first and second side parts in the second direction is smaller than a distance between the third and fourth outer surfaces opposing each other in the second direction.

2. The multilayer electronic component of claim 1, wherein the first internal electrode patterns are exposed to only the third outer surface and the fifth outer surface of the body, on which the first external electrode and the first side part are disposed, among the outer surfaces of the body, and the second internal electrode patterns are exposed to only the fourth outer surface and the sixth outer surface of the body, on which the second external electrode and the second side part are disposed, among the outer surfaces of the body.

3. The multilayer electronic component of claim 1, wherein the first internal electrode patterns are exposed on the third surface of the body from one point of an edge formed by the third surface and the fifth surface of the body to a point spaced apart by a predetermined distance from an opposite edge of the third surface of the body, and are exposed on the fifth surface of the body from the one point of the edge formed by the third surface and the fifth surface of the body to a point spaced apart by a predetermined distance from an opposite edge of the fifth surface of the body.

4. The multilayer electronic component of claim 3, wherein the second internal electrode patterns are exposed on the fourth surface of the body from one point of an edge formed by the fourth surface and the sixth surface of the body to a point spaced apart by a predetermined distance from an opposite edge of the fourth surface of the body, and are exposed on the sixth surface of the body from the one point of the edge formed by the fourth surface and the sixth surface of the body to a point spaced apart by a predetermined distance from an opposite edge of the sixth surface of the body.

5. The multilayer electronic component of claim 1, wherein the first side part is disposed to cover all of the first internal electrode patterns exposed to the fifth outer surface of the body on which the first side part is disposed, and
   the second side part is disposed to cover all of the second internal electrode patterns exposed to the sixth outer surface of the body on which the second side part is disposed.

6. The multilayer electronic component of claim 1, wherein the first and second internal electrode patterns each have rectangular strip shapes that are the same shape as each other, and the first and second internal electrode patterns are stacked in a vertical direction such that the first internal electrode patterns are offset in a horizontal direction with respect to the second internal electrode patterns in the body.

7. The multilayer electronic component of claim 1, wherein the first and second internal electrode patterns are disposed parallel to the first and second outer surfaces of the body opposing each other in the first direction.

8. The multilayer electronic component of claim 1, wherein a shape of the first internal electrode patterns is the same as a shape of the second internal electrode patterns.

9. The multilayer electronic component of claim 1, wherein a length of the first internal electrode pattern exposed to the third surface of the body is the same as a length of the second internal electrode pattern exposed to the fourth surface of the body, and
   a length of the first internal electrode pattern exposed to the fifth surface of the body is the same as a length of the second internal electrode pattern exposed to the sixth surface of the body.

10. A method of manufacturing a multilayer electronic component, the method comprising:
    forming first and second ceramic green sheets using a slurry containing a powder having a dielectric property, a binder, and a solvent;
    printing first and second internal electrode base patterns on one surface of the first and second ceramic green sheets, respectively, the first and second internal electrode base patterns including one or more strip shapes that are the same shape as each other;

alternately stacking the first ceramic green sheets including the first internal electrode base patterns and the second ceramic green sheets including the second internal electrode base patterns;

cutting a multilayer bar in which the first and second ceramic green sheets are stacked to form individual bodies each including a multilayer structure in which first and second internal electrode patterns are alternately stacked and containing a dielectric material;

disposing first and second side parts on respective first and second opposing outer surfaces of each body to each cover less than an entirety of the respective first or second opposing outer surface of the body; and disposing first and second external electrodes on respective third and fourth outer surfaces of each body opposing each other in a first direction, wherein a length of each of the first and second side parts in the first direction is smaller than a distance between the third and fourth outer surfaces opposing each other in the first direction, and wherein the first external electrode is further disposed on a portion of the first opposing outer surface of each body that is free of the first side part, and the second external electrode is further disposed on a portion of the second opposing outer surface of each body that is free of the second side part.

11. The method of claim 10, wherein the first and second internal electrode base patterns are printed to each have a shape in which one or more strips are spaced apart from each other by a predetermined interval in a width direction of the first and second ceramic green sheets.

12. The method of claim 10, wherein the alternate stacking of the first ceramic green sheets and the second ceramic green sheets includes stacking of the first and second ceramic green sheets such that positions at which the one or more strips are disposed on the first ceramic green sheets overlap with positions at which the one or more strips are disposed on the second ceramic green sheets, and stacking the first ceramic green sheets and the second ceramic green sheets such that the strips disposed thereon are offset with respect to each other by predetermined intervals in a width direction and a length direction.

13. The method of claim 10, wherein the alternately stacking of the first ceramic green sheets and the second ceramic green sheets includes offsetting positions at which the one or more strips are disposed on the first ceramic green sheets with respect to positions at which the one or more strips are disposed on the second ceramic green sheets, and stacking the first ceramic green sheets and the second ceramic green sheets so that edges of the first and second ceramic green sheets in a width direction and edges of the first and second ceramic green sheets in a length direction overlap with each other.

14. The method of claim 10, wherein the cutting of the multilayer bar in which the first and second ceramic green sheets are stacked includes:

the multilayer bar being cut between a first region in which the strip shape in the first internal electrode base pattern and the strip shape in the second internal electrode base pattern overlap each other and an edge of the strip shape in the first internal electrode base pattern extending from the first region, and the multilayer bar being cut between the first region in which the strip shape in the first internal electrode base pattern and the strip shape in the second internal electrode base pattern overlap each other and an edge of the strip shape in the second internal electrode base pattern extending from the first region.

15. The method of claim 14, wherein the multilayer bar is cut along an edge of the strip shape in the first internal electrode base pattern and an edge of the strip shape in the second internal electrode base pattern to allow edges of the first internal electrode patterns to be exposed onto the outer surfaces on which the first external electrode and the first side part are disposed and allow edges of the second internal electrode patterns to be exposed onto the outer surfaces on which the second external electrode and the second side part are disposed.

16. The method of claim 10, wherein the first side part is disposed to contact only the first internal electrode patterns from among the first and second internal electrode patterns, and the second side part is disposed to contact only the second internal electrode patterns from among the first and second internal electrode patterns.

17. The method of claim 10, wherein the first side part is formed by applying a first slurry containing a solvent compatible with a binder contained in an electrode paste forming the second internal electrode base pattern onto at least the first outer surface of the body, and the second side part is formed by applying a second slurry containing a solvent compatible with a binder contained in an electrode paste forming the first internal electrode base pattern onto at least the second outer surface of the body.

18. A multilayer electronic component comprising:

a body including alternately stacked first and second internal electrodes disposed in a dielectric body;

first and second side parts disposed, respectively, on opposing first and second outer surfaces of the body; and first and second external electrodes disposed, respectively, on third and fourth outer surfaces of the body opposing each other in a first direction, wherein the first and second internal electrodes each have rectangular strip shapes that are the same shape as each other, and the first and second internal electrodes are stacked in a vertical direction such that the first internal electrodes are offset in a horizontal direction with respect to the second internal electrodes in the body, a length of each of the first and second side parts in the first direction is smaller than a distance between the third and fourth outer surfaces opposing each other in the first direction, the first and second outer surfaces of the body each include a first portion in which at least one of the first and second internal electrodes are exposed, and a second portion that is free of the first and second internal electrodes, and the first and second side parts each cover the first portion of the respective first or second opposing outer surface of the body, and the first and second external electrodes each extend onto the second portion of the respective first and second opposing outer surface of the body.

19. The multilayer electronic component of claim 18, wherein:

the first internal electrodes are exposed to the first and third outer surfaces of the body, and the second internal electrodes are exposed to the second and fourth outer surfaces of the body different from the first and third outer surfaces of the body.

20. The multilayer electronic component of claim 19, wherein the first and second internal electrodes are disposed parallel to opposing fifth and sixth surfaces of the body.

21. The multilayer electronic component of claim 19, wherein:
    each rectangular strip shaped first internal electrode has a first edge coincident with the first outer surface of the body and a second edge coincident with the third outer surface of the body, and
    each rectangular strip shaped second internal electrode has a first edge coincident with the second outer surface of the body and a second edge coincident with the fourth outer surface of the body.

22. The multilayer electronic component of claim 21, wherein each rectangular strip shaped first internal electrode has third and fourth edges parallel to and spaced apart from the second and fourth outer surfaces of the body; and
    each rectangular strip shaped second internal electrode has third and fourth edges parallel to and spaced apart from the first and third outer surfaces of the body.

23. The multilayer electronic component of claim 19, wherein a first internal electrode is exposed on the first and third outer surfaces of the body continuously from a first point spaced apart from edges of the first outer surface to a second point disposed at an edge common to the first and third outer surfaces, and continuously from the second point to a third point spaced apart from edges of the third outer surface, and
    a second internal electrode is exposed on the second and fourth outer surfaces of the body continuously from a fourth point spaced apart from edges of the second outer surface to a fifth point disposed at an edge common to the second and fourth adjacent outer surfaces, and from the fifth point to a sixth point spaced apart from edges of the fourth outer surface.

24. The multilayer electronic component of claim 19, wherein the first and second external electrodes are conductive; and
    the first and second side parts are non-conductive.

25. A method comprising:
    alternately stacking first and second ceramic green sheets in a vertical direction to form a multilayer bar,
    wherein:
        the first and second ceramic green sheets each respectively have first and second internal electrodes disposed thereon,
        each of the first and second internal electrodes includes two or more rectangular strip shapes that are the same shape as each other and spaced apart from each other, and
        the first and second ceramic green sheets are stacked such that the first internal electrodes are offset in a horizontal direction with respect to the second internal electrodes in the multilayer bar;
    cutting the multilayer bar along at least one vertical cutting surface to form two or more individualized bodies, wherein the cutting of the multilayer bar exposes on one vertical cutting surface only the first internal electrodes from among the first and second internal electrodes;
    disposing a first side part on a portion of the one vertical cutting surface in which the first internal electrodes are exposed in each body; and
    disposing a first external electrode to extend on at least another portion of the one vertical cutting surface that is free of the first internal electrodes in each body,
    wherein a length of the first side part in the horizontal direction along the one vertical cutting surface is smaller than a length of the one vertical cutting surface in the horizontal direction.

26. The method of claim 25, wherein the cutting the multilayer bar exposes on another vertical cutting surface only the second internal electrodes from among the first and second internal electrodes.

27. The method of claim 25, wherein the cutting the multilayer bar comprises cutting the multilayer bar along the at least one vertical cutting surface to expose the first internal electrodes to first and second adjacent outer surfaces of a body, and to expose the second internal electrodes to third and fourth adjacent outer surfaces of the body different from the first and second outer surfaces of the body.

28. The method of claim 25, further comprising:
    disposing second side parts on first portions of outer surfaces of each body opposing the one vertical cutting surface; and
    disposing second external electrodes on second portions, different from the first portions, of the outer surfaces of each body opposing the one vertical cutting surface.

29. The method of claim 28, wherein the first side part is insulating, and is disposed on the one vertical cutting surface exposing only the first internal electrodes from among the first and second internal electrodes.

30. A multilayer electronic component comprising:
    a body including a multilayer structure in which first and second internal electrode patterns are alternately stacked, containing a dielectric material, and having outer surfaces including first and second outer surfaces opposing each other in a first direction, third and fourth outer surfaces opposing each other in a second direction, and fifth and sixth outer surfaces opposing each other in a third direction;
    first and second external electrodes disposed, respectively, on the third and fourth outer surfaces among the outer surfaces of the body, and electrically connected to the first and second internal electrode patterns, respectively; and
    first and second side parts disposed, respectively, on the fifth and sixth outer surfaces among the outer surfaces of the body,
    wherein the first internal electrode patterns are exposed to the third outer surface and the fifth outer surface of the body on which the first external electrode and the first side part are disposed, respectively,
    the second internal electrode patterns are exposed to the fourth outer surface and the sixth outer surface of the body on which the second external electrode and the second side part are disposed, respectively, and
    both the first side part and the second external electrode are directly disposed on portions of the first internal electrode patterns exposed to the fifth outer surface, and both the second side part and the first external electrode are directly disposed on portions of the second internal electrode patterns exposed to the sixth outer surface.

31. The multilayer electronic component of claim 30, wherein the first internal electrode patterns are exposed to only the third outer surface and the fifth outer surface of the body, on which the first external electrode and the first side part are disposed, among the outer surfaces of the body, and
    the second internal electrode patterns are exposed to only the fourth outer surface and the sixth outer surface of the body, on which the second external electrode and the second side part are disposed, among the outer surfaces of the body.

32. The multilayer electronic component of claim 30, wherein the first side part is disposed to cover all of the first internal electrode patterns exposed to the fifth outer surface of the body on which the first side part is disposed, and the second side part is disposed to cover all of the second internal electrode patterns exposed to the sixth outer surface of the body on which the second side part is disposed.

33. The multilayer electronic component of claim 30, wherein the first and second internal electrode patterns each have rectangular strip shapes that are the same shape as each other, and the first and second internal electrode patterns are stacked in a vertical direction such that the first internal electrode patterns are offset in a horizontal direction with respect to the second internal electrode patterns in the body.

* * * * *